United States Patent [19]

Rapp

[11] 4,361,992

[45] Dec. 7, 1982

[54] LUMINAIRE SUPPORT APPARATUS

[75] Inventor: William J. Rapp, Hayward, Calif.

[73] Assignee: Gardco Manufacturing, Inc., San Leandro, Calif.

[21] Appl. No.: 223,984

[22] Filed: Jan. 12, 1981

[51] Int. Cl.³ .......................... E04B 5/52; H02G 3/26
[52] U.S. Cl. .......................................... 52/28; 52/484; 362/148
[58] Field of Search ............................ 52/28, 39, 484; 362/147–150; 174/49

[56] References Cited

U.S. PATENT DOCUMENTS

| | | | |
|---|---|---|---|
| 3,001,001 | 9/1961 | Bibb | 362/148 X |
| 3,590,135 | 6/1971 | Herbenar | 174/49 |
| 4,114,327 | 9/1978 | Williams | 52/28 |

FOREIGN PATENT DOCUMENTS 2846050  1/1980  Fed. Rep. of Germany .......... 52/28

OTHER PUBLICATIONS

"Illuminating Engineering", J. S. Hamel, Apr. 1959, pp. 229–233.

Primary Examiner—J. Karl Bell
Attorney, Agent, or Firm—Robert W. Dilts

[57] ABSTRACT

A luminaire support apparatus for suspending and selectively positioning a pendant luminaire from a suspended ceiling is disclosed. The luminaire mounting stem may be positioned directly beneath a support member of the suspended ceiling. The support apparatus includes a base for carrying a ballast and an electrical junction box, and is selectively positioned between adjacent, parallel support members along a first axis parallel to the ceiling. A bracket which receives the luminaire mounting stem is mounted to a cylindrical stem projecting through a ceiling tile. The bracket receives a lower end portion of the stem, normally axially aligning the mounting stem with the cylindrical stem or offsetting the axial alignment should the mounting stem be positioned directly beneath the support member. The base receives a pair of clips selectively along a second axis parallel to the ceiling and perpendicular to the first axis. The clips mount the upper end portion of the stem to the base.

6 Claims, 8 Drawing Figures

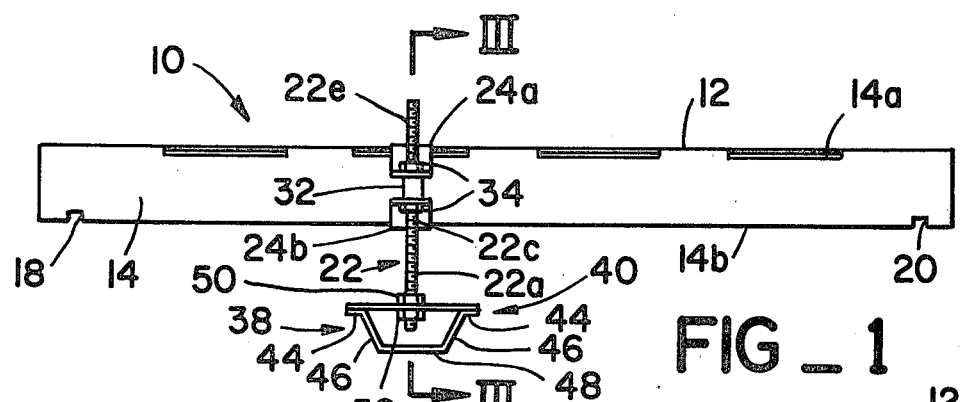
FIG_1
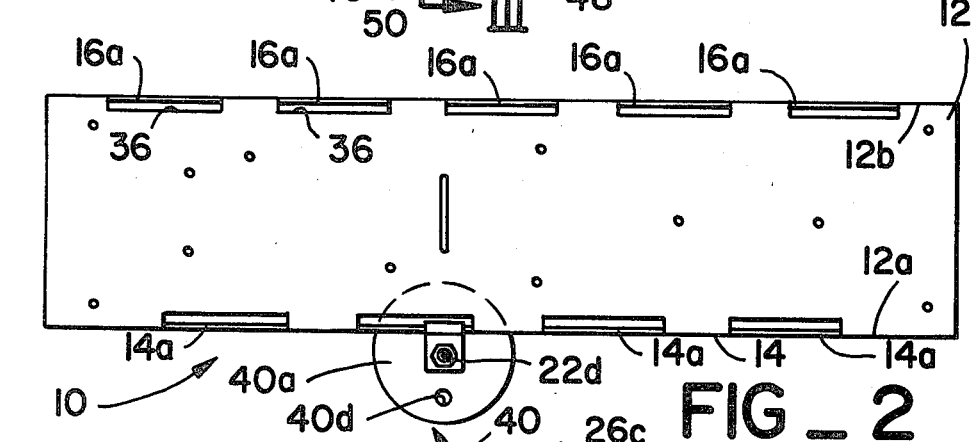
FIG_2
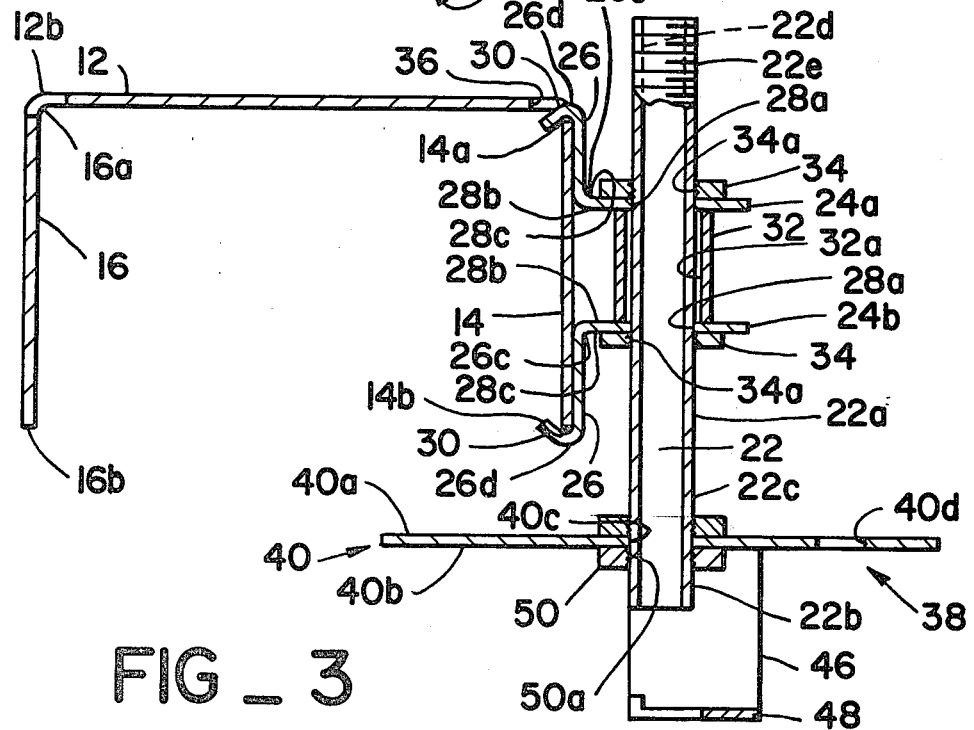
FIG_3

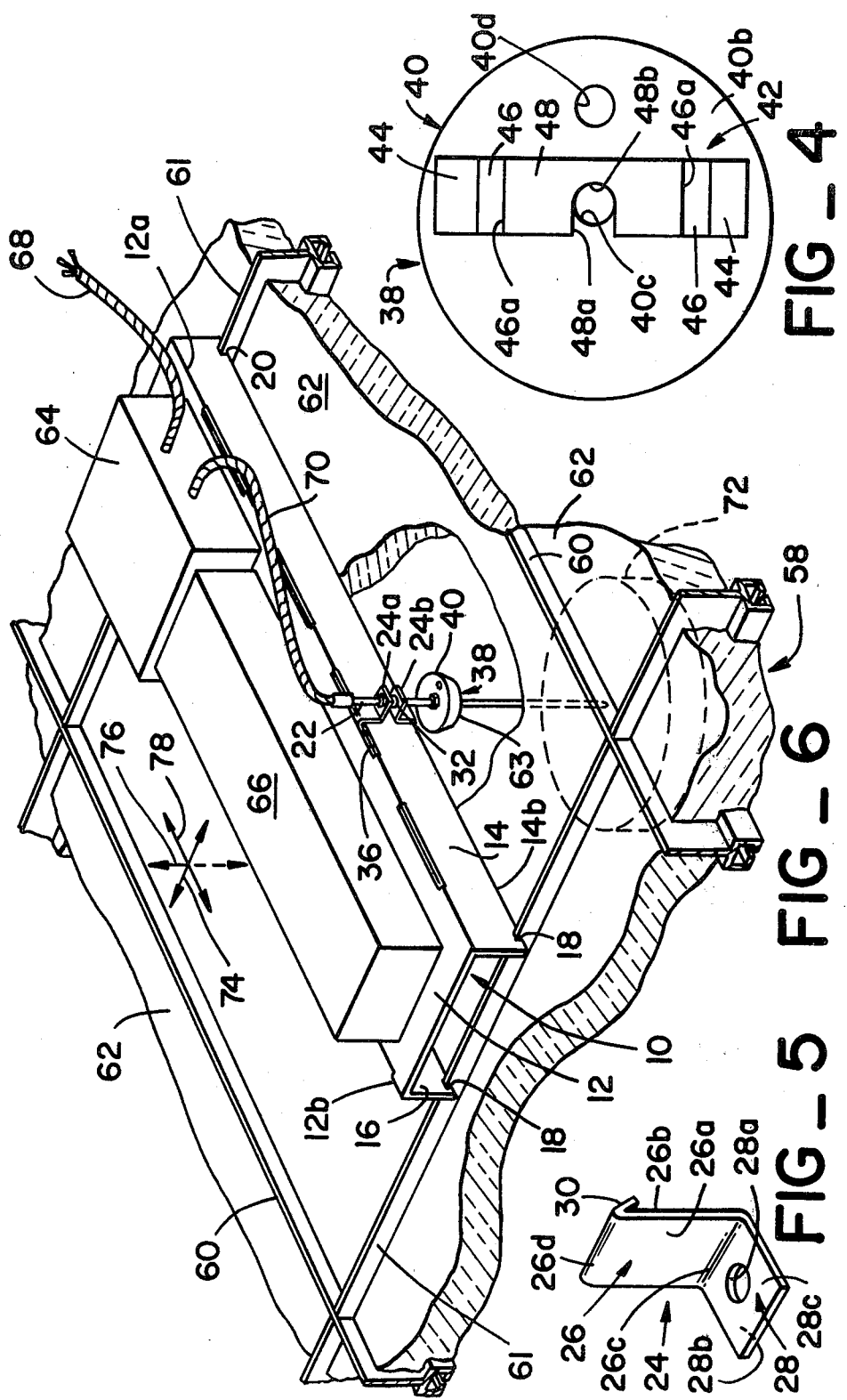

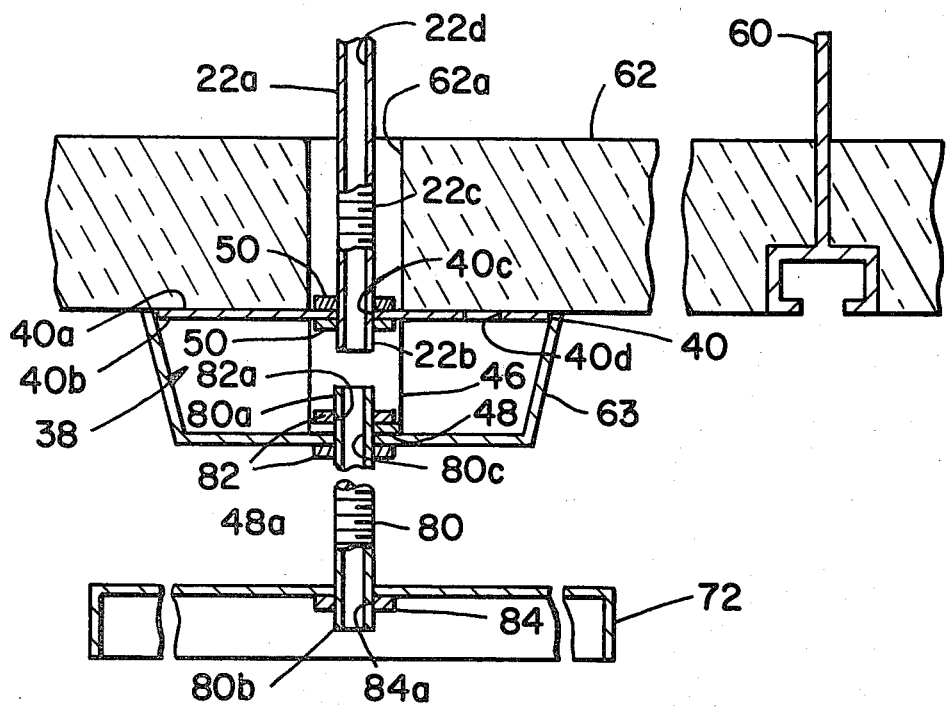
FIG_7
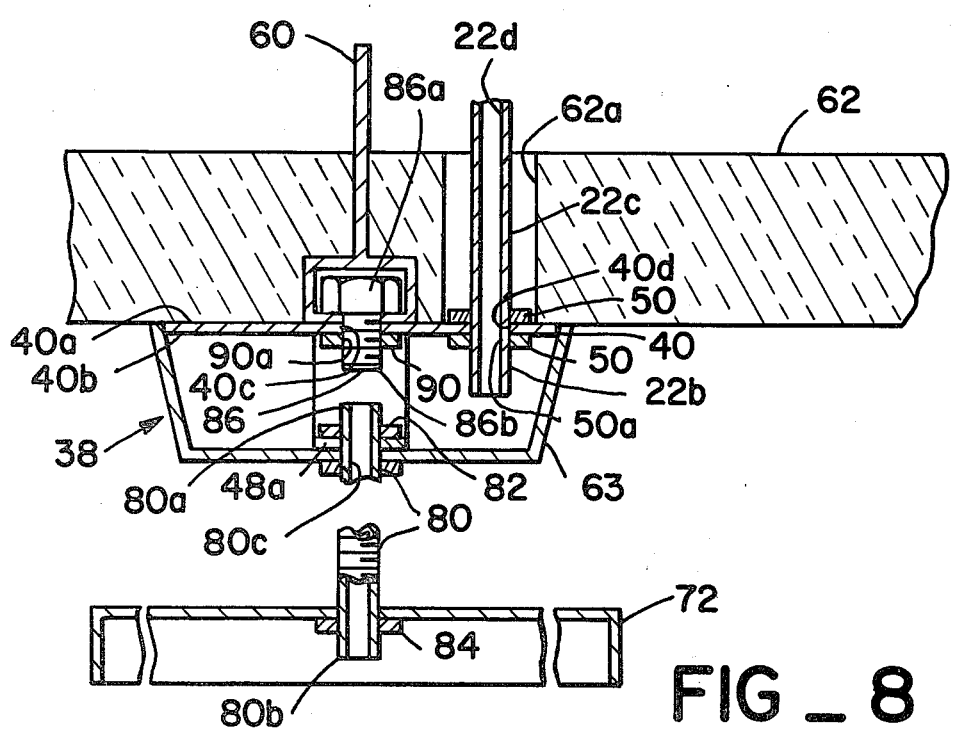
FIG_8

LUMINAIRE SUPPORT APPARATUS

DESCRIPTION

Technical Field

The present invention relates generally to luminaire hardware, and more particularly, to a luminaire support apparatus for suspending and selectively positioning a pendant luminaire from a ceiling.

Prior Art

A typical commercial building, such as an office building, generally has a structural ceiling and a suspended ceiling of acoustically insulative ceiling tiles. The suspended ceiling conceals the usual ventilation and electrical hardware within the building. A typical suspended ceiling construction has a plurality of intersecting support members forming a lattice structure with the ceiling tiles adapted to be received within the openings of the lattice structure. It is often desirable to suspend a pendant type luminaire having a mounting stem projecting upwardly from the luminaire to the suspended ceiling. The ceiling tiles are generally nonsupportive, therefore the luminaire must be suspended by the support members.

A known apparatus for attaching the mounting stem of the luminaire to the support members includes a first bracket secured perpendicularly between two parallel support members. An electrical junction box is supported by the bracket and the mounting stem is attached to the junction box. A second bracket disposed proximately to the first bracket may also be utilized for supporting a ballast should the luminaire require a ballast. The ballast electrically couples the junction box securing the luminaire to another junction box containing the building wire, making the usual electrical connections to supply electricity to the luminaire. The mounting apparatus is concealed by projecting the mounting stem of the luminaire through the ceiling tile.

Although the known apparatus provides flexibility in determining the mounting position of the luminaire, selected mounting positions directly beneath the support members and especially at the intersection of support members are unavailable because the first junction box is disposed between the support members and, also, the mounting stem may not pass through a position occupied by any support member.

It is an object of the present invention to provide a luminaire support apparatus for the unrestricted selective positioning of the luminaire mounting stem.

It is a further object of the present invention to provide a luminaire mounting apparatus which supports the first junction box, the ballast and the luminaire with a single bracket.

It is yet another object of the present invention to provide a luminaire mounting apparatus which is simpler in construction than known mounting apparatus.

SUMMARY OF THE INVENTION

According to the invention, a luminaire support apparatus comprises a base in linear slidable engagement on a lattice structure of a suspended ceiling construction. The linear slidable engagement is along a first axis parallel to the plane of the lattice structure. A stem has a first end portion, a second end portion and a body portion disposed between the first and second end portions and dimensioned commensurate with the thickness of a ceiling tile. Mounting means mount the first end portion to the base perpendicularly to the first axis. Attaching means attach the second end portion to the mounting stem of the luminaire. The base includes means for selectively receiving the mounting means along a further axis orthogonal to the first axis and the stem.

Other objects, advantages and features of the present invention will become apparent from the following specification when read in connection with the drawings herein.

BRIEF DESCRIPTION OF THE DRAWINGS

FIG. 1 is a side plan view of a mounting apparatus according to the principles of the present invention;

FIG. 2 is a top plan view of the mounting apparatus shown in FIG. 1;

FIG. 3 is a cross-sectional view taken along line III—III of FIG. 2;

FIG. 4 is a bottom view of a detail shown in FIG. 1;

FIG. 5 is a perspective view of a detail shown in FIG. 1;

FIG. 6 is a perspective view, partially broken away, illustrating a typical employment of the mounting apparatus of FIG. 1;

FIG. 7 is an enlarged cross-sectional view of a portion of FIG. 6; and

FIG. 8 is a cross-sectional view similar to FIG. 7 illustrating an alternative employment of the embodiment shown in FIG. 6.

DETAILED DESCRIPTION OF THE DRAWINGS

Referring to FIGS. 1 through 5, there is shown a support apparatus 10 for suspending and selectively positioning a pendant luminaire from a suspended ceiling. Apparatus 10 comprises a base 12 including a pair of side portions 14 and 16 extending downwardly from edges 12a and 12b, respectively. Each side portion 14 and 16 has an upper edge 14a and 16a and a lower edge 14b and 16b, respectively. A pair of notches 18 and 20 are disposed along each lower edge 14b and 16b.

A generally cylindrical stem 22 includes a first end portion 22a, a second end portion 22b, a body portion 22c disposed between first and second end portions 22a and 22b, a cylindrical axial bore 22d and a threaded outer surface 22e.

A pair of clips 24 are provided to mount first end portion 22a to base 12. Each clip 24 includes a generally rectangular first body portion 26 having a front side 26a, a back side 26b, a first edge 26c and a second edge 26d, each edge 26c and 26d being opposite of the other. Clip 24 further includes a second generally rectangular body portion 28 having an opening 28a dimensioned to receive stem 22 in linear slidable engagement. Second body portion 28 extends perpendicularly from front side 26a along edge 26c. Clip 24 further includes a generally rectangular lip portion 30 extending obliquely from back side 26b along edge 26d defining a fold. Stem 22 is received into opening 28a of each clip 24 so that side 28b of each clip 24 faces each other defining an upper clip 24a and a lower clip 24b. A generally cylindrical sleeve 32 has an axial bore 32a dimensioned for slidably receiving stem 22. Sleeve 22 is disposed between each body portion 28 of clips 24a and 24b encasing stem 22. Sleeve 32 is dimensioned so that twice the length of first body portion 26 between edges 26c and 26d plus the length of sleeve 32 is substantially equal to the width of each side portion 14 and 16. A pair of fasteners 34, such as a common nut, have a threaded opening 34a commensurate with threaded outer surface 22e. Each fastener 34 is mounted on to first end portion 22a for engaging second side 28c of each clip 24 for holding each body portion 28 against sleeve 32 axially along stem 22.

Base 12 further includes a plurality of slots 36 alternatingly disposed along edges 12a and 12b exposing selected edge portions of upper edge 14a and 16a of side portions 14 and 16, respectively. One of slots 36 is selected for receiving lip portion 30 of upper clip 24a so that the upper edge of one of said side portions, shown herein as side portion 14, is received within the fold between lip portion 30 and first body portion 26 of upper clip 24a. The lower edge of one of the side portions, shown herein as side portion 14, is received within the fold between lip portion 30 and first body portion 26 of lower clip 24b.

Bracket means such as a bracket 38 for attaching the mounting stem of a luminaire to second end portion 22b includes a circular plate 40 having an upper surface 40a, a lower surface 40b, an axial opening 40c dimensioned to receive second end portion 22b in slidable engagement and an opening 40d disposed radially outward from opening 40c and also dimensioned to receive second end portion 22b in slidable engagement. A bracket member 42 includes a pair of generally rectangular flange portions 44 mounted to lower surface 40b at radial opposite edges thereof. A pair of generally rectangular support portions 46 extend substantially downward and radially inward from flange portions 44. A generally rectangular platform portion 48 is disposed between lower edges 46a of each support portion 46. Platform portion 48 has a notch 48a with an arcuate edge 48b axially aligned with opening 40c. Opening 40c or opening 40d is selected to receive second end portion 22b as hereinafter described. A fastener 50 has a threaded opening 50a commensurate with threaded outer surface 22e and is received by end portion 22b for supporting bracket 38 by lower surface 40b.

The construction of the present invention has been hereinabove described in great detail. In order that one skilled in the art may make full use of the invention, a description of the utility and operation of the present invention hereinafter follows.

Referring now to FIG. 6, there is shown a typical suspended ceiling construction 58 including a plurality of parallel support members 60 and a plurality of parallel support members 61 perpendicularly intersecting support members 60, defining a lattice structure in a horizontal plane. A plurality of ceiling tiles 62 are adapted to be received within the openings of the lattice structure. Base 12 is demountably mounted within ceiling construction 58 by receiving adjacent parallel support members, shown herein as support members 61, within notches 18 and 20 being separated by a distance commensurate with a distance between the adjacent parallel support members. Base 12 further carries an electrical junction box 64 and a ballast 66, each of usual design. A first electrical cable 68 couples junction box 64 to the building electrical network. A second electrical cable 70 electrically couple junction box 64 to a pendant luminaire 72 through a junction box defined by canopy cover 63 and plate 40. Second cable 70 is routed through axial bore 22d. The electrical connections within canopy cover 63 which couples cable 70 to luminaire 72 and within junction box 64 which couple first cable 68, second cable 70 and ballast 66 are well known and need not be described herein.

Side portions 14 and 16, along with notches 18 and 20 therein, define means for demountably supporting said base 12 in linear slidable engagement on the lattice structure. Luminaire 72 may be selectively positioned along a first selected axis parallel to the plane of the lattice structure and by sliding base 12 along support members 61 in the direction shown by arrow 74. Clips 24 in combination with sleeve 32 and fasteners 34 define means for mounting first end portion 22a to base 12. Stem 22 is mounted defining a second axis perpendicular to the plane of the lattice structure, thereby being perpendicular to the first axis shown as arrow 76. Slots 36 define means for selectively receiving the mounting means along a third axis orthogonal to the first and second axis. Luminaire 72 is positioned along the third axis shown as arrow 78 by receiving the mounting means within a selected slot 36. Slots 36 are alternatingly staggered along edges 12a and 12b so that the entire length of base 12 is available for receiving the mounting means and further for providing structural support between base 12 and each side portion 14 and 16 to carry the weight of ballast 66 as well as luminaire 72. Base 12 further dissipates heat developed by ballast 66.

The hereinabove description with reference to FIG. 6 describes the applicability of support apparatus 10 on the top side of the ceiling construction 58. The applicability of support apparatus 10 on the underside of ceiling construction 58 hereinafter follows.

FIG. 7 shows ceiling tile 62 having an opening 62a dimensioned for receiving body portion 22c therein. First end portion 22a and second end portion 22b extend outwardly from the top and bottom sides of ceiling tile 62, respectively. Circular plate 40 is held against ceiling tile 62 by fasteners 50. Luminaire 72 typically includes a threaded mounting stem 80 projecting upwardly therefrom. A first end portion 80a of mounting stem 80 receives fastener 82 having threaded opening 82a commensurate with mounting stem 80. Luminaire 72 is supported by a fastener 84 having a threaded opening 84a secured to a second end portion 80b of mounting stem 80. Luminare 72 is suspended by receiving end portion 80a into notch 48a and resting fastener 82 on the upper surface of platform portion 48. Second electrical cable 70, shown in FIG. 4, is routed through opening 22d and is electrically coupled to electrical connectors (not shown) extending from luminaire 72 through axial bore 80c.

FIG. 8 illustrates alternate application of mounting apparatus 10 should it be necessary to suspend luminaire 72 directly beneath a support member, shown herein as support member 60. A short threaded bolt 86, dimensioned to be received within axial opening 40c, has a head 86a received into a slotted opening 60a of support member 60. A threaded end portion 86b of bolt 86 receives a fastener 90 having a threaded opening 90a commensurate with bolt 86 for holding circular plate 40 by means of opening 40c against the underside of ceiling tile 62. Second end portion 22b of stem 22 is secured by fasteners 50 to circular plate 40 as hereinabove described, except second end portion 22b is received into opening 40d. The distance separating openings 40c and 40d was selected as hereinabove described for aligning mounting stem 80 directly beneath support member 60. Luminaire 72 is suspended by stem 80 and electrically coupled to second electrical cable 70 as hereinabove described with reference to FIG. 7.

There has been described novel apparatus and techniques for suspending and selectively positioning a pendant luminaire from a suspended ceiling. It is believed that those skilled in the art will make obvious modifications to the embodiment of the present invention disclosed herein without departing from the inventive concepts as hereinafter claimed.

What is claimed is:

1. In a suspended ceiling construction having a plurality of intersecting support members defining a lattice structure in a horizontal plane and a plurality of ceiling tiles adapted to be received within the openings of the lattice structure, a support apparatus for suspending and selectively positioning a pendant luminaire having a mounting stem projecting upwardly from the luminaire, said support apparatus comprising:

a base including means for demountably supporting said base in linear slidable engagement on said lattice structure, the linear slidable engagement being along a first selected axis parallel to the plane of the lattice structure;

a generally cylindrical stem defining a second selected axis, said stem including a first end portion, a second end portion and a body portion disposed between said first and second portions, said body portion being axially dimensioned commensurate with the thickness of said ceiling tiles;

means for mounting said first end portion to said base, said mounting means being operative to align said second axis substantially perpendicular to said first axis, said base further including means for selectively receiving said mounting means along a third selected axis orthogonal to said first and said second axis; and bracket means for attaching the mounting stem to said second end portion, and operative to axially align or offset the mounting stem to said second end portion.

2. A support apparatus as in claim 1 in which said supporting means includes a pair of generally rectangular side portions extending downwardly from said base, each of said side portions having an upper edge disposed along said base, a lower edge and a pair of notches disposed along said lower edge, each notch being separated by a distance commensurate with the distance between adjacent parallel support members and being adapted for receiving said support members.

3. A support apparatus as in claim 2 in which said receiving means includes a plurality of slots alternatingly disposed along opposite edge portions of said base, and each slot exposing selected upper edge portions of said side portions.

4. A support apparatus as in claim 3 in which said mounting means includes a pair of clips, each clip having a first body portion, a lip portion extending outwardly from a first edge of said body portion, a second body portion extending outwardly from a second edge of said first body portion and having an opening dimensioned to receive said first end portion of said stem, a first side of each of said second body portions being axially disposed along said first end portion facing each other, the fold of said upper clip receiving one of said selected upper edge portions, the fold of said lower clip receiving said lower edge portion of the respective side portion.

5. A mounting apparatus as in claim 1 in which said bracket means includes a circular plate having a first and a second opening for selectively receiving said second end portion and for holding the upper surface of said plate to the bottom surface of said ceiling tile, and a bracket member extending downwardly from the lower surface of said circular plate and having a platform portion, said platform portion having a notch for receiving the mounting stem of said luminaire.

6. A mounting apparatus as in claim 5 in which said notch is axially aligned with said first axial opening.

* * * * *